(12) United States Patent
Lund (10) Patent No.: US 7,046,675 B2
(45) Date of Patent: May 16, 2006

(54) METHOD AND APPARATUS TO CONFIGURE A DIGITAL SUBSCRIBER LINE DEVICE

(75) Inventor: Sven O. Lund, Holte (DK)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 10/004,439

(22) Filed: Oct. 23, 2001

(65) Prior Publication Data

US 2003/0076835 A1 Apr. 24, 2003

(51) Int. Cl.
*H04L 12/28* (2006.01)
*H04L 12/56* (2006.01)

(52) U.S. Cl. ............... 370/395.2; 370/395.3; 709/220

(58) Field of Classification Search ....... 370/395.2, 370/395.3, 395.1, 409, 410, 400, 389, 397, 370/399, 465, 468, 351, 252, 254, 420, 401; 709/220, 227, 223, 224, 218, 229
See application file for complete search history.

(56) References Cited

U.S. PATENT DOCUMENTS

| | | | | |
|---|---|---|---|---|
| 6,125,119 | A * | 9/2000 | Cherukuri et al. | 370/410 |
| 6,580,718 | B1 * | 6/2003 | Chapman | 370/409 |
| 6,636,505 | B1 * | 10/2003 | Wang et al. | 370/352 |
| 6,714,972 | B1 * | 3/2004 | Lee et al. | 709/220 |
| 6,748,439 | B1 * | 6/2004 | Monachello et al. | 709/229 |
| 6,778,525 | B1 * | 8/2004 | Baum et al. | 370/351 |
| 6,829,250 | B1 * | 12/2004 | Voit et al. | 370/467 |
| 6,873,628 | B1 * | 3/2005 | Tang | 370/480 |
| 6,874,041 | B1 * | 3/2005 | Burd et al. | 710/38 |
| 6,885,672 | B1 * | 4/2005 | Tang et al. | 370/412 |
| 6,891,825 | B1 * | 5/2005 | O'Dell et al. | 370/352 |
| 6,894,983 | B1 * | 5/2005 | Lederman et al. | 370/252 |
| 6,904,054 | B1 * | 6/2005 | Baum et al. | 370/467 |
| 2002/0044567 | A1 * | 4/2002 | Voit et al. | 370/467 |
| 2002/0095484 | A1 * | 7/2002 | Pagani et al. | 709/220 |
| 2002/0150108 | A1 * | 10/2002 | Nattkemper et al. | 370/397 |
| 2002/0176365 | A1 * | 11/2002 | Lund | 370/244 |
| 2003/0026273 | A1 * | 2/2003 | Davison et al. | 370/409 |
| 2003/0039244 | A1 * | 2/2003 | Owens et al. | 370/389 |
| 2003/0039268 | A1 * | 2/2003 | Chong et al. | 370/466 |
| 2003/0053449 | A1 * | 3/2003 | Owens et al. | 370/355 |
| 2004/0105444 | A1 * | 6/2004 | Korotin et al. | 370/395.5 |

OTHER PUBLICATIONS

AF-NM-0122.000, "Auto-configuration of PVCs", May 1999, The ATM Forum Technical Committee, pp. 1-3, figure 1.*
TR-037, "Auto-Configuration for the Connection Between the DSL Broadband Network Termination (B-NT) and the Network using ATM", Mar. 2001, DSL Forum Technical Report, pp. 1-10.*

* cited by examiner

*Primary Examiner*—Ajit Patel
*Assistant Examiner*—Chirag Shah
(74) *Attorney, Agent, or Firm*—Kacvinsky LLC (57) ABSTRACT

A method and apparatus to configure a permanent virtual circuit (PVC) between a digital subscriber line (DSL) customer premise equipment (CPE) and a DSL access module (DSLAM) is described.

15 Claims, 4 Drawing Sheets

METHOD AND APPARATUS TO CONFIGURE A DIGITAL SUBSCRIBER LINE DEVICE

BACKGROUND

As reliance on network communications increases, so does the desire for high-speed network access. One popular technique for providing high-speed network access is digital subscriber line (DSL) technology. DSL technology may be implemented with reduced infrastructure costs through the use of conventional twisted-pair copper wires, which are already present in many homes and offices. As a result of the many advantages offered by DSL technology, there may be a substantial need for new and improved DSL technologies to further enhance these advantages while overcoming conventional limitations.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to automatically configure a DSL device. For example, the embodiments of the invention may automatically configure a permanent virtual circuit (PVC) between a DSL customer premise equipment (CPE) and a DSL access module (DSLAM). This may be advantageous, for example, when different providers produce the DSL CPE and DSLAM. In this situation, the DSL CPE and DSLAM may not share the same PVC configuration information. Conventional techniques to handle this mismatch are unsatisfactory for a number of reasons, as detailed further below.

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
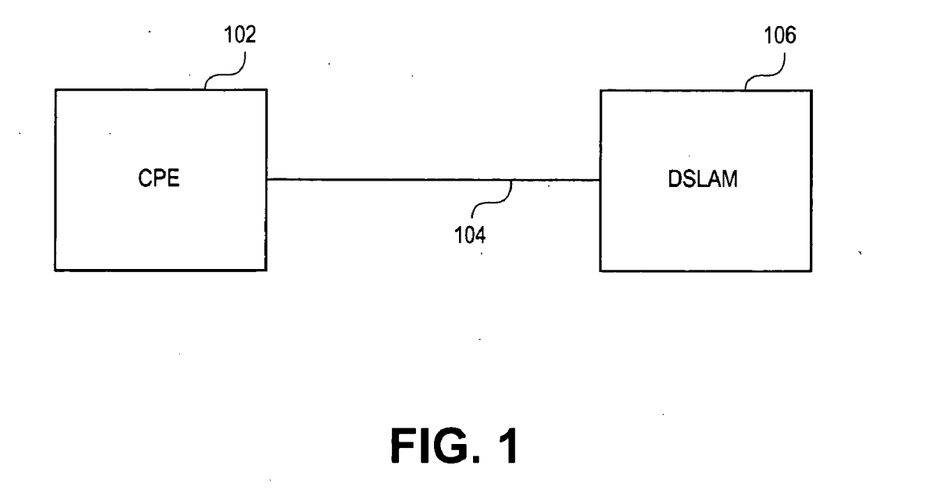
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a CPE 102 connected to a DSLAM 106 via connection 104. CPE refers to a device located at a client or customer location, which may comprise hardware and/or software to communicate over a network to another device. Examples of CPE may include a DSL or asynchronous DSL (ADSL) router, a DSL or ADSL bridge, a DSL or ADSL modem, and so forth. The term "CPE" as used herein may refer to both CPE and DSL CPE. In one embodiment of the invention, CPE 102 may comprise a DSL CPE. The term DSL CPE as used herein may refer to any DSL device that is located at a customer or client location. DSLAM 106 may be located, for example, at a telephone central office (TELCO).

A user may establish a DSL connection between CPE 102 and DSLAM 106 using a number of well-known protocols, such as a High-level Data Link Control (HDLC), International Organization for Standardization, ISO/IEC 3309, adopted in 1993, Asynchronous Transfer Mode (ATM) layer specification, International Telecommunication Union (ITU) Recommendation I.361, adopted in February 1999 ("ATM Specification"), Asynchronous Transfer Mode Forum and Frame-based User-Network Interface (ATM FUNI), The ATM Forum Technical Committee, defined in Frame Based User-To-Network Interface Specification v2.0, AF-SAA-0088.000, July 1997. DSL CPE and DSLAMS are typically configured to communicate using one or more such protocols.

The ATM protocol as described in the ATM Specification is becoming increasingly popular for use in high-speed networks, particularly as used in combination with DSL technology. ATM is a connection-orientated protocol and as such there is a connection identifier in every cell header which explicitly associates a cell with a given virtual channel on a physical link. The connection identifier may consist of two sub-fields, the virtual channel identifier (VCI) and the virtual path identifier (VPI). Together, the VCI and VPI are used in multiplexing, de-multiplexing and switching a cell through the network. VCIs and VPIs are not addresses. They are explicitly assigned at each segment (link between ATM nodes) of a connection when a connection is established, and remain for the duration of the connection. Using the VCI/VPI the ATM layer can asynchronously interleave (multiplex) cells from multiple connections.

An ATM connection may be of two types, often referred to as a permanent virtual circuit (PVC) and a switched virtual circuit (SVC). A SVC may be a temporary virtual circuit that is set up and used only as long as data is being transmitted. Once the communication between the two hosts is complete, the SVC disappears. By way of contrast, a PVC remains available at all times.

During the initial deployment of a CPE 102, it may be desirable to configure a PVC between CPE 102 and DSLAM 106. Certain configuration information may be needed to configure the PVC between CPE 102 and DSLAM 106. The configuration information may comprise, for example, a VCI and VPI as described above.

As mentioned previously, a problem may arise due to a mismatch in configuration information provisioned in the CPE and DSLAM. Frequently, the CPE and DSLAM are made by different vendors, and therefore do not provision their equipment with the same configuration information. For example, the VCI and VPI values stored in the CPE may not be the same VCI and VPI values stored in the DSLAM. As a result, when a new CPE is deployed at a user location, a PVC between the CPE and DSLAM may not be configured absent some external mechanism. For example, a user may have to manually enter the configuration information for the CPE, which may often be a tedious and time-consuming process, particularly with a large number of CPE deployments.

Another attempt to handle this mismatch is to automatically configure (auto-configure) a PVC. The term "automatically configure," "auto-configure," and its variants may be defined herein to mean configuration of a PVC with limited human intervention. A number of PVC automated configuration solutions currently exist, such as those described in the DSL Forum PVC Auto-Configuration Standard Specification, TR-037, the ATM Forum Integrated Local Management Interface (ILMI) Specification, AF-ILMI-0065, the ATM Forum PVC Auto-Configuration Specification, AF-NM-0122. Another technique referred to as "PVC Hunting" may also be used to automatically configure a PVC. PVC Hunting entails having the CPE passively listen to the received cell stream and determine an active PVC and associated configuration information from good cell headers.

These and other PVC auto-configuration algorithms, however, are not complete solutions. Any one technique may fail to properly configure a CPE for a host of reasons. Further, even though a CPE may be capable of using one PVC auto-configuration algorithm, the particular DSLAM to which the CPE is attempting to set up the PVC may not be properly configured to implement the same algorithm. This is particularly problematic given that there are a large number of installed DSLAMS with mixed levels of PVC auto-configuration support, a problem that may increase as new PVC auto-configuration algorithms become adopted and implemented in future DSLAM devices.

One embodiment of the invention may solve the PVC auto-configuration problem by implementing a configuration manager capable of managing the implementation of a plurality of PVC auto-configuration algorithms. The configuration manager could include a list of PVC auto-configuration algorithms ("ACC list") and their implementation details, such as protocols, required configuration information, and so forth. Upon initialization of a CPE, such as a DSL CPE, the configuration manager would attempt to establish a PVC between the DSL CPE and a DSLAM using one of the PVC auto-configuration algorithms in its ACC list. If the first PVC auto-configuration algorithm fails, a second PVC auto-configuration algorithm may be executed. This process may continue until the PVC has been configured, the ACC list of algorithms has been exhausted, a time-out value is reached, or some other terminating condition occurs.

As a result, the configuration manager may increase the likelihood of automated PVC configuration, particularly with DSLAMs having mixed levels of PVC auto-configuration support. This will also decrease the need for legacy and future DSLAMs to be deployed or upgraded with multiple PVC auto-configuration algorithms, thereby potentially decreasing the cost associated with each DSLAM.

Figure 2:
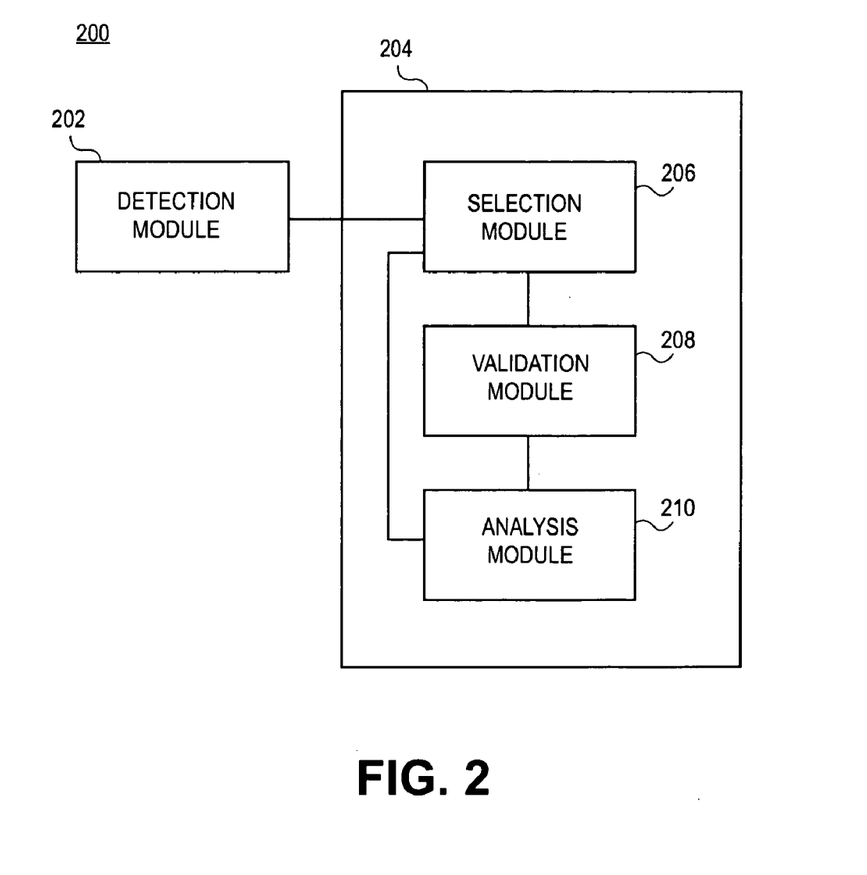
FIG. 2 is a block diagram of a configuration manager in accordance with one embodiment of the invention.

FIG. 2 is a block diagram of a configuration manager in accordance with one embodiment of the invention. FIG. 2 illustrates a configuration manager 200 that may be implemented as part of, for example, CPE 102. Configuration manager 200 may include a detection module 202 and a configuration module 204. Detection module 202 may detect the connection of CPE 102 with a DSLAM, such as DSLAM 106. It is worthy to note that detection module 202 may be separate from, or part of, the standard CPE 102 initialization process.

Once a connection is detected, configuration module 204 may determine whether a PVC between CPE 102 and DSLAM 106 has been established, and if not, to begin the PVC auto-configuration process. Configuration module 204 may include, for example, a selection module 206, a validation module 208, and an analysis module 210. As stated previously, each of these modules may be implemented in software, hardware or a combination of both. Further, it can be appreciated that the functionality for configuration module 200 may be implemented using more modules, or by combining these modules into fewer modules, and still fall within the scope of the invention.

Figure 3:
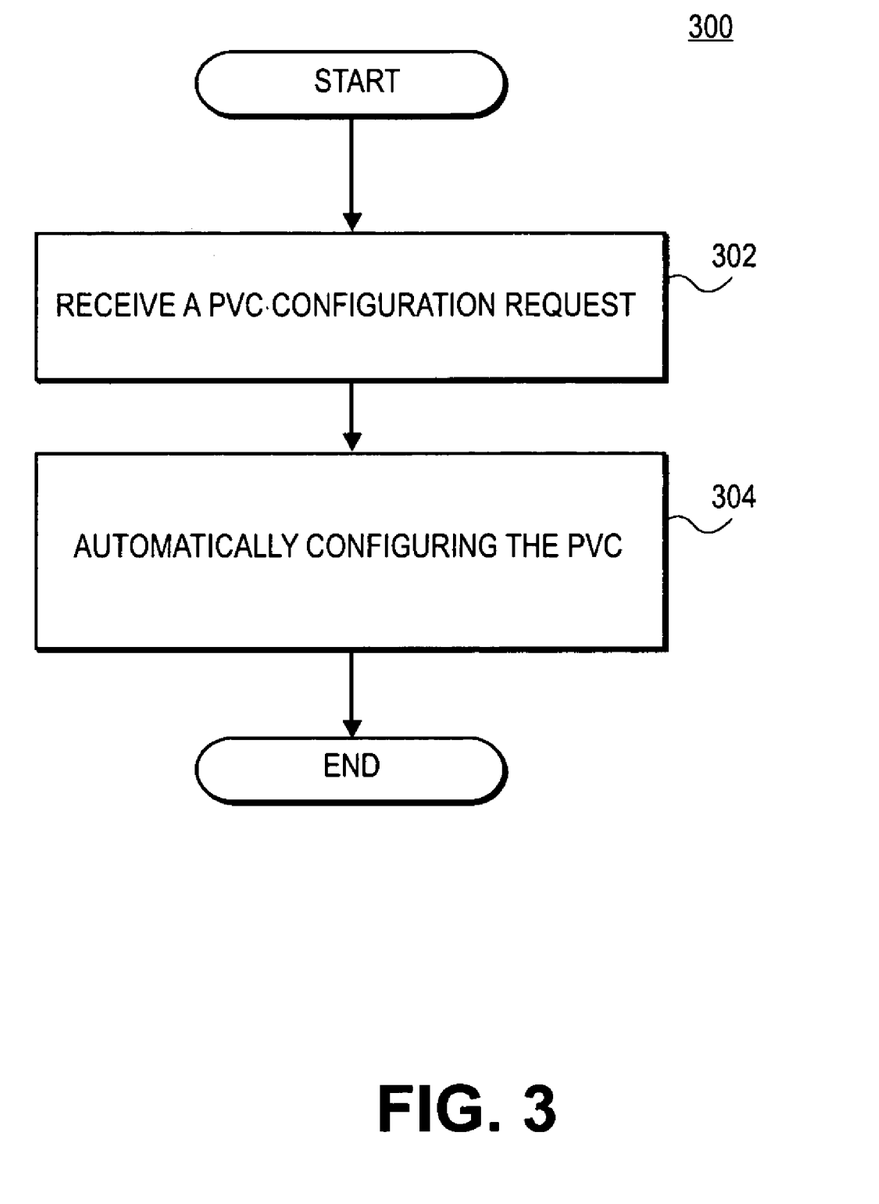
FIG. 3 is a first block flow diagram of the programming logic that may be performed by a configuration manager in accordance with one embodiment of the invention.
Figure 4:
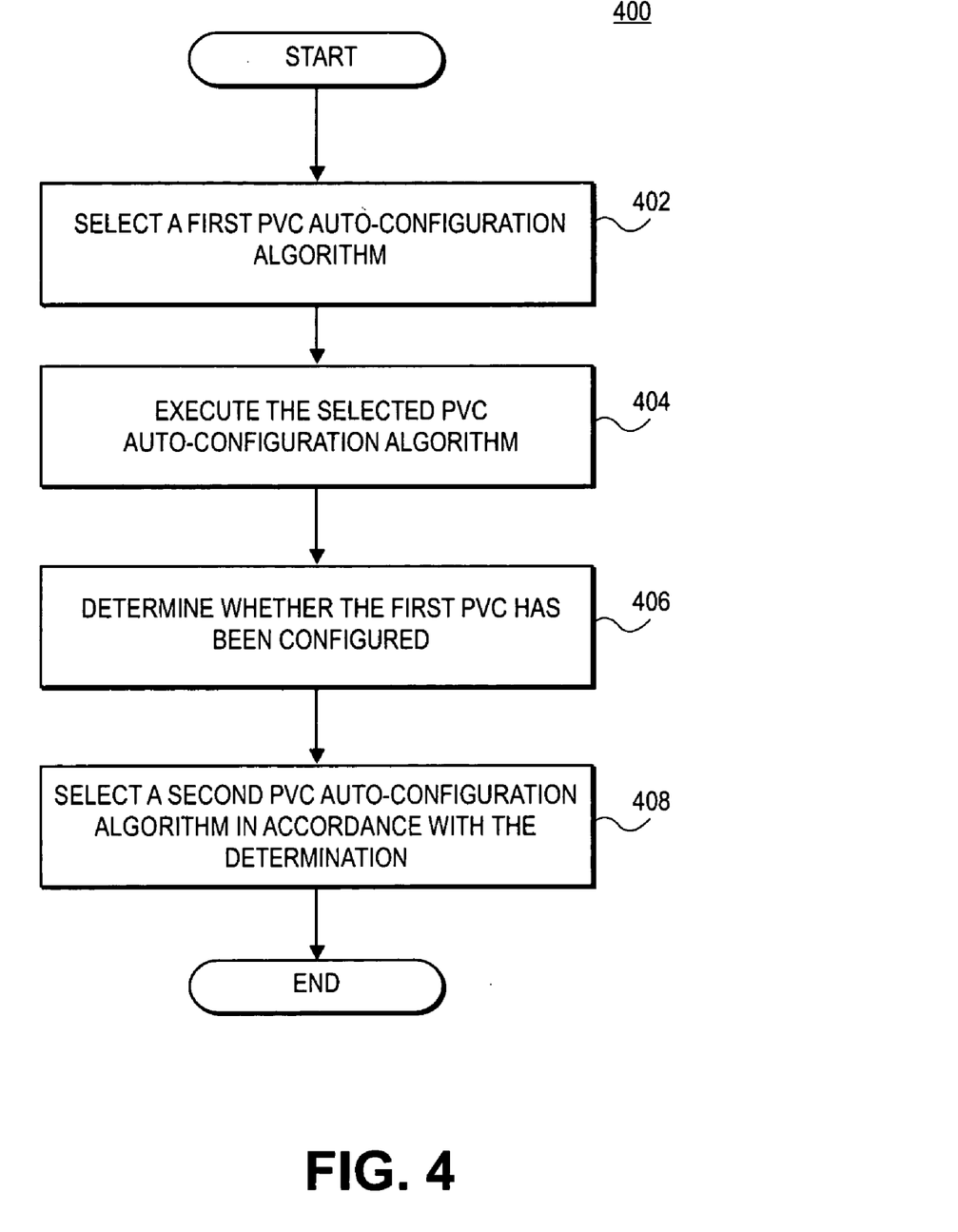
FIG. 4 is a second block flow diagram of programming logic that may be performed by a configuration manager in accordance with one embodiment of the invention.
Figure 5:
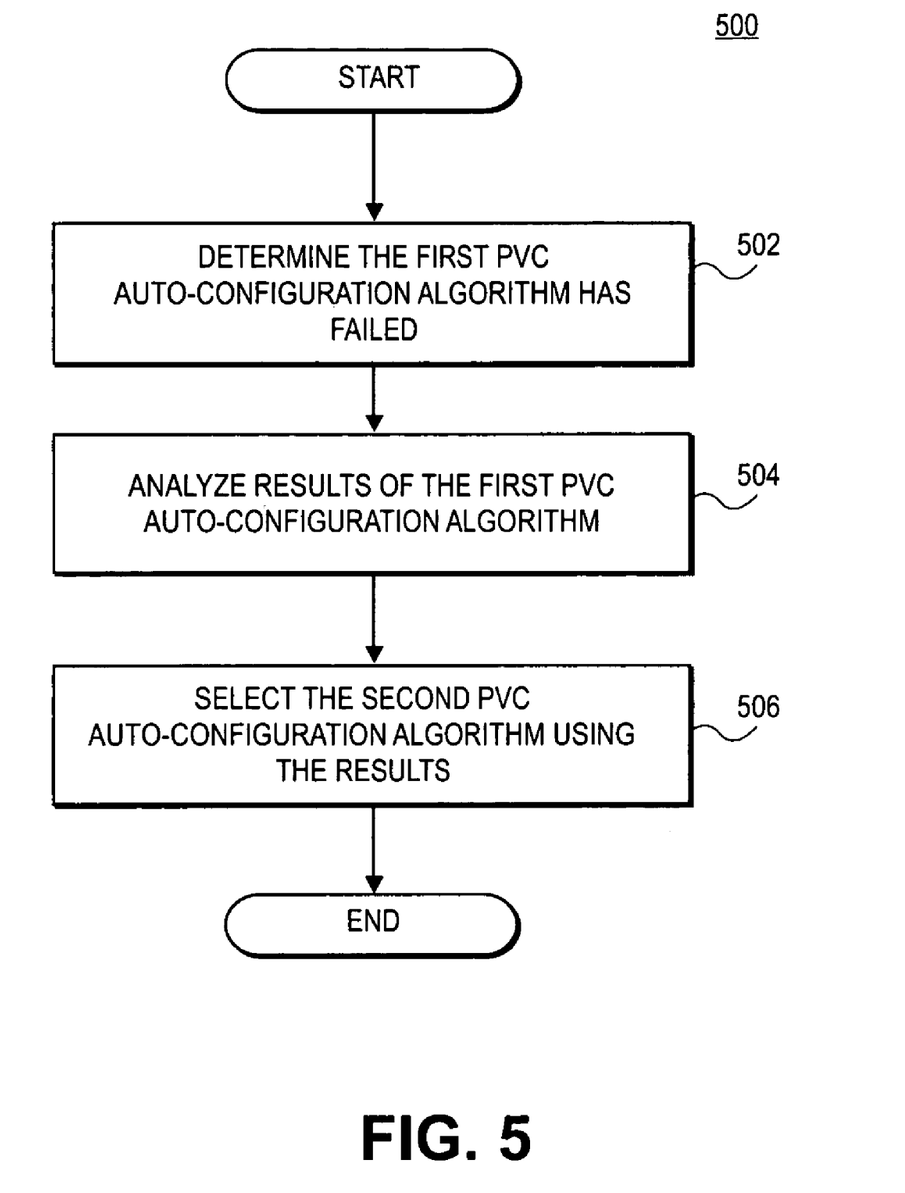
FIG. 5 is a third block flow diagram of programming logic that may be performed by a configuration manager in accordance with one embodiment of the invention.

The operations of systems 100 and 200 may be further described with reference to FIGS. 3–5 and accompanying examples. Although FIGS. 3–5 presented herein may include a particular processing logic, it can be appreciated that the processing logic merely provides an example of how the general functionality described herein can be implemented. Further, each operation within a given processing logic does not necessarily have to be executed in the order presented unless otherwise indicated. In one embodiment of the invention, the programming logic of FIGS. 3–5 may be implemented using a processor and appropriate software comprising computer program segments.

FIG. 3 is a first block flow diagram of the programming logic that may be performed by a configuration manager in accordance with one embodiment of the invention. In one embodiment of the invention, the configuration manager may refer to the software and/or hardware used to implement the functionality for PVC auto-configuration as described herein. In this embodiment of the invention, the configuration manager may be implemented as part of CPE 102. It can be appreciated that this functionality, however, may be implemented by any device, or combination of devices, located anywhere in a communication network accessible by CPE 102 and DSLAM 106 and still fall within the scope of the invention.

FIG. 3 illustrates a programming logic 300 to configure a network device, such as a DSL CPE. A request to configure a first PVC between a DSL device and a DSLAM is received at block 302. The first PVC is automatically configured using one of a plurality of PVC auto-configuration algorithms at block 304. Examples of PVC auto-configuration algorithms may include any conventional auto-configuration algorithms, such as PVC hunt, ILMI PVC auto-configuration, PVC probing and so forth.

FIG. 4 is a second block flow diagram of programming logic that may be performed by a configuration manager in accordance with one embodiment of the invention. FIG. 4 illustrates a programming logic 400. Programming logic 400 is an example of how the first PVC may be automatically configured. A first PVC auto-configuration algorithm may be selected at block 402. The selected PVC auto-configuration algorithm may be executed at block 404. A determination may be made as to whether the first PVC has been configured at block 406. A second PVC auto-configuration algorithm may be selected in accordance with the determination at block 406 at block 408.

FIG. 5 is a third block flow diagram of programming logic that may be performed by a configuration manager in accordance with one embodiment of the invention. FIG. 5 illustrates programming logic a programming logic 500. Programming logic 500 is an example of how the second PVC auto-configuration algorithm may be selected. A determination is made that the first PVC auto-configuration algorithm has failed at block 502. The results of the first PVC auto-configuration algorithm are analyzed at block 504. The second PVC auto-configuration algorithm is selected using the results at block 506.

In one embodiment of the invention, a CPE may use more than one PVC. In this case, configuration manager may configure multiple PVCs for the CPE. To configure multiple PVCs between a CPE and DSLAM, the configuration manager may need additional information from a user of the CPE. The configuration manager may therefore also include a user interface to allow a user to access certain functionality for the configuration manager, such as providing configuration information for one or more PVCs, modifying time out periods for the PVC auto-configuration process, disabling certain PVC auto-configuration functions, and so forth.

One embodiment of invention may be used to configure a second PVC as follows. A request to configure a second PVC for said DSL device may be received, along with configuration information for the second PVC. The configuration information may comprise, for example, a VCI and a VPI. The configuration manager may then complete the configuration process for the second PVC using the configuration information.

In one embodiment of the invention, a terminating condition may occur prior to completing configuration of the first PVC. In this case, the first PVC may be manually configured. For example, a notice message indicating that the first PVC was not configured may be sent to a user. Configuration information for the first PVC may be received from the user via the user interface.

The operation of systems 100 and 200, and the processing logic shown in FIGS. 3–5 may be better understood by way of example. Assume a CPE is scheduled for deployment. The CPE may be, for example, a CPE to deliver ATM over DSL, such as a DSL/ATM router, an ADSL/ATM router, a DSL/ATM bridge, an ADSL/ATM bridge, a DSL or ADSL modem, and so forth. The DSL CPE is connected to a TELCO DSLAM over a communications medium, such as twisted-pair copper wire. Power is delivered to the DSL CPE, and an initialization routine is started. Part of the initialization routine may be to detect whether a PVC has been configured for the DSL CPE. Detection module 202 may be used to detect whether a PVC has been configured as part of the initialization routine or as part of the configuration manager. If there is no PVC configured for the DSL CPE, a request to configure a PVC between the DSL CPE and the DSLAM is sent from the detection module 202 to configuration module 204. Upon receiving the configuration request, selection module 206 of configuration module 204 begins the PVC auto-configuration process. Selection module 206 selects a PVC auto-configuration algorithm from a PVC ACC list. The ACC list may comprise a predefined list of PVC auto-configuration algorithms as previously described. Configuration module 204 begins execution of the selected PVC auto-configuration algorithm.

Validation module 208 monitors the execution process to determine whether a PVC has been properly configured. This may be accomplished by receiving packets from the DSLAM with the appropriate configuration information for the PVC. Validation module 208 may perform a testing sequence to ensure the PVC is properly configured. For example, validation module 208 may use the configuration information to send test packets to the DSLAM and monitor for return packets with good cell headers. If the configuration information is valid, the configuration information is stored and the PVC is activated. A PVC configuration complete message may then be sent to the user.

In the event the PVC is not configured prior to the occurrence of a terminating condition, information regarding the failed attempt may be sent to analysis module 210. Examples of a terminating condition may comprise an explicit or implicit message from the DSLAM that the PVC auto-configuration algorithm is not supported, complete execution of the PVC auto-configuration algorithm without validation of proper configuration from validation module 208, a time out value is reached, an so forth.

Analysis module 210 may be used to select the next PVC auto-configuration algorithm used to set up the PVC. Validation module 208 may gather information regarding the failed previous attempt that may be useful in selecting another PVC auto-configuration algorithm having a better chance of success. For example, a response packet may not have all the proper or necessary configuration information for a PVC, indicating that the same PVC auto-configuration algorithm may be used again to see if the correct configuration information may be retrieved. Analysis module 210 may analyze the results and provide feedback to selection module 206. Selection module 206 may then select the same or another PVC auto-configuration algorithm from the ACC list based on the results.

In another embodiment of the invention, analysis module 210 may be omitted from configuration module 204. In this embodiment of the invention, selection module 206 may select the next PVC auto-configuration algorithm randomly or in the order defined in the ACC list.

In one embodiment of the invention, a terminating condition may occur prior to completing configuration of the PVC. In this case, the PVC may be manually configured. For example, a notice message indicating that the PVC was not configured may be sent to a user. Configuration information for the PVC may be received from the user via the user interface. Configuration module 204 may use the configuration information to complete the PVC configuration process, including validation and testing.

In some cases the DSL CPE will use multiple PVCs. In this case, the configuration manager may configure multiple PVCs for the CPE. This may be accomplished by having configuration information for the additional PVCs manually configured using, for example, the user interface. For example, configuration module 204 may receive a request to configure a second PVC for the DSL device, along with configuration information for the second PVC. Upon detection of configuration information included as part of the configuration request, configuration module 204 may pass the configuration information directly to validation module 208 to validate and test the second PVC. If the configuration information is valid, the configuration information is stored and the second PVC is activated. A PVC configuration complete message may then be sent to the user. This process may be repeated for any number of PVCs desired for a particular DSL CPE.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to configure a network device, comprising:
   receiving a request to configure a first permanent virtual circuit (PVC) between a digital subscriber line (DSL) device and a DSL access module (DSLAM); and
   automatically configuring said first PVC including
      selecting a first PVC auto-configuration algorithm;
      executing said selected PVC auto-configuration algorithm;
      determining whether said first PVC has been configured; and
      selecting a second PVC auto-configuration algorithm in accordance with said determination.

2. The method of claim 1, wherein said selecting a second PVC auto-configuration algorithm comprises:
   determining said first PVC auto-configuration algorithm has failed;
   analyzing results of said first PVC auto-configuration algorithm; and
   selecting said second PVC auto-configuration algorithm using said results.

3. The method of claim 1, further comprising:
   receiving a request to configure a second PVC for said DSL device;
   receiving configuration information for said second PVC; and
   configuring said second PVC using said configuration information.

4. The method of claim 3, wherein said configuration information may comprise a virtual channel identifier (VCI) and a virtual pat identifier (VPI).

5. The method of claim 1, wherein each of said PVC configuration algorithms further comprising at least one of a PVC hunt, an integrated local management interface (ILMI) PVC auto-configuration, or PVC probing.

6. The method of claim 1, further comprising:
   sending a message that said first PVC was not configured after each of said PVC auto-configuration algorithms have been used; and
   receiving configuration information for said first PVC from a user.

7. A system to configure a network device, comprising:
   a digital subscriber line (DSL) customer premise equipment (CPE);
   a DSL access module (DSLAM) connected to said DSL CPE; and
   a DSL configuration manager to configure a permanent virtual circuit (PVC) between said DSL CPE and said DSLAM, the DSL configuration manager to further
      select a first PVC auto-configuration algorithm;
      execute said selected PVC auto-configuration algorithm;
      determine whether said first PVC has been configured; and
      select a second PVC auto-configuration algorithm in accordance with said determination.

8. The system of claim 7, said DSL CPE further comprising at least one of an asynchronous DSL (ADSL)/asynchronous transfer mode (ATM) router or an ADSL/ATM bridge.

9. The system of claim 7, wherein said PVC may be configured using configuration information comprising a virtual channel identifier (VCI) and a virtual path identifier (VPI).

10. A configuration manager for a network device, comprising:

a detection module to detect connection of a digital subscriber line (DSL) device with a DSL access module (DSLAM);

a configuration module to configure a permanent virtual circuit (PVC) between said DSL device and said DSLAM, said configuration module including a selection module to select a PVC auto-configuration algorithm;

a validation module to confirm configuration of said PVC; and an analysis module to provide selection information to said selection module to select another PVC auto-configuration algorithm in accordance with results from said validation module.

11. The configuration manager of claim 10, wherein said PVC may be configured using configuration information comprising a virtual channel identifier (VCI) and a virtual path identifier (VPI).

12. An article comprising:

a storage medium;

said storage medium including stored instructions that, when executed by a processor, result in receiving a request to configure a first permanent virtual circuit (PVC) between a digital subscriber line (DSL) device and a DSL access module (DSLAM), and automatically configuring said first PVC by selecting a first PVC auto-configuration algorithm, executing said selected PVC auto-configuration algorithm, determining whether said first PVC has been configured, and selecting a second PVC auto-configuration algorithm in accordance with said determination.

13. The article of claim 12, wherein the stored instructions, when executed by a processor, result in selecting the second PVC auto-configuration algorithm by determining said first PVC auto-configuration algorithm has failed, analyzing results of said first PVC auto-configuration algorithm, and selecting said second PVC auto-configuration algorithm using said results.

14. The article of claim 12, wherein the stored instructions, when executed by a processor, further result in receiving a request to configure a second PVC for said DSL device, receiving configuration information for said second PVC, and configuring said second PVC using said configuration information.

15. The article of claim 12, wherein the stored instructions, when executed by a processor, further result in sending a message that said first PVC was not configured after each of said PVC auto-configuration algorithms have been used, and receiving configuration information for said first PVC from a user.

* * * * *

UNITED STATES PATENT AND TRADEMARK OFFICE
CERTIFICATE OF CORRECTION

PATENT NO. : 7,046,675 B2
APPLICATION NO. : 10/004439
DATED : May 16, 2006
INVENTOR(S) : Lund Page 1 of 1

It is certified that error appears in the above-identified patent and that said Letters Patent is hereby corrected as shown below:

In column 8, line 31, in Claim 4, delete "pat" and insert -- path --, therefor.

In column 8, line 32, in Claim 5, after "claim 1," delete "wherein".

Signed and Sealed this

Second Day of October, 2007

JON W. DUDAS
*Director of the United States Patent and Trademark Office*